March 24, 1942.  J. J. WYDLER  2,277,471
GAS TURBINE SYSTEM
Filed Nov. 12, 1938  2 Sheets-Sheet 1
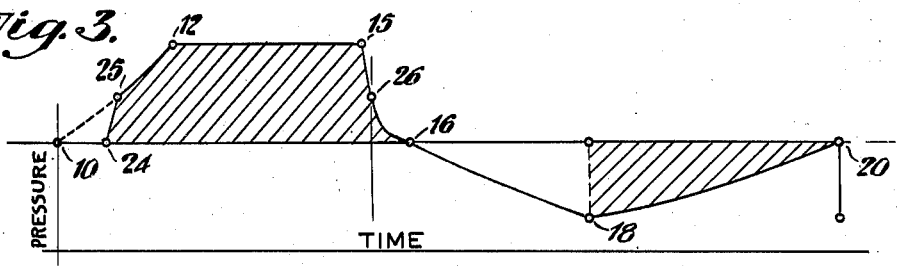
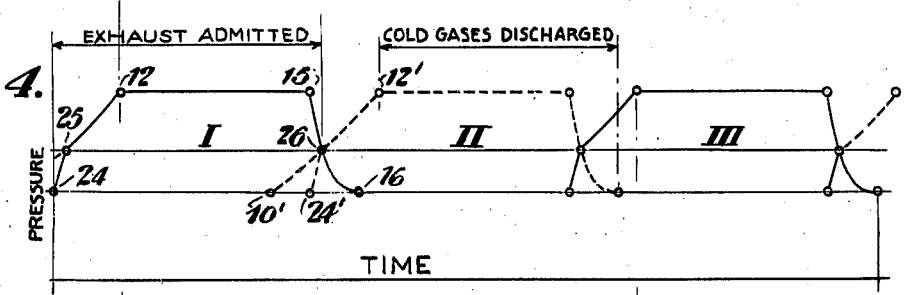
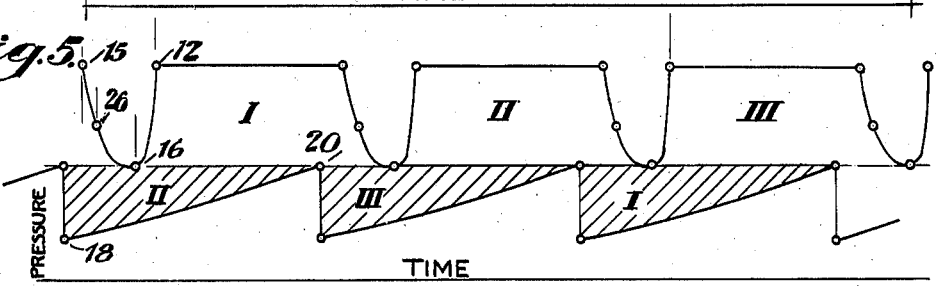
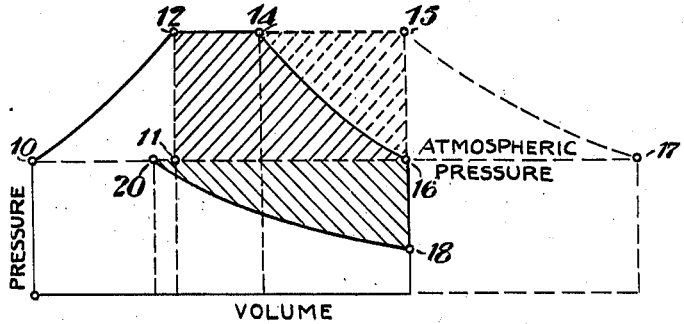
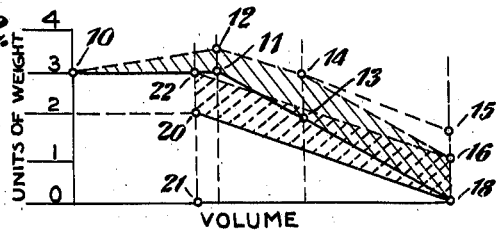
INVENTOR
JOHANN J. WYDLER
BY
ATTORNEY March 24, 1942. J. J. WYDLER 2,277,471
GAS TURBINE SYSTEM
Filed Nov. 12, 1938 2 Sheets-Sheet 2
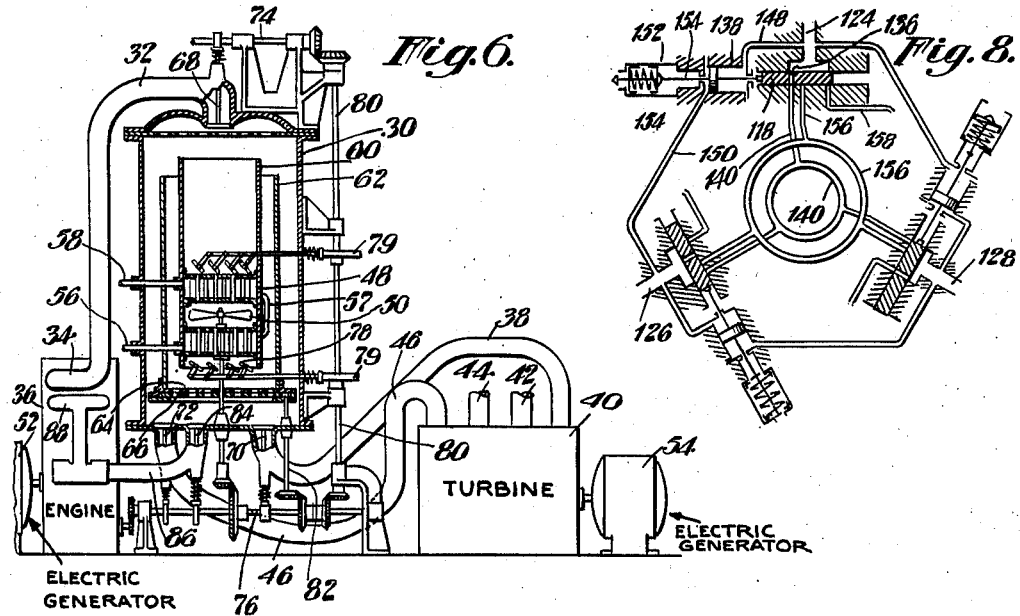
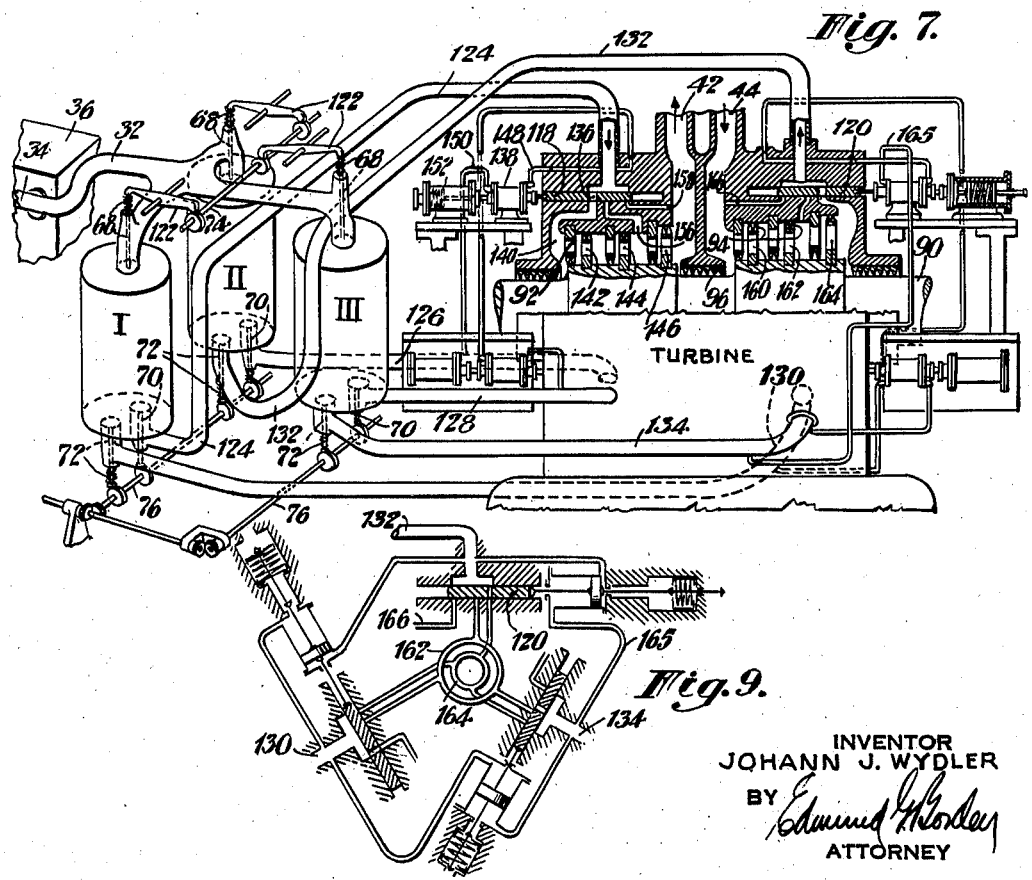
INVENTOR
JOHANN J. WYDLER
BY
ATTORNEY Patented Mar. 24, 1942

2,277,471

UNITED STATES PATENT OFFICE 2,277,471

GAS TURBINE SYSTEM

Johann J. Wydler, Westfield, N. J., assignor, by mesne assignments, to Cities Service Oil Company, New York, N. Y., a corporation of Pennsylvania Application November 12, 1938, Serial No. 240,017

27 Claims. (Cl. 60—11)

This invention relates generally to internal combustion engines, and is particularly concerned with an improved exhaust gas turbine system.

It is a particular object of the invention to provide novel method and apparatus for converting potential energy carried by hot gases under pressure into mechanical energy.

Gas turbines have been developed heretofore for use in converting to mechanical energy part of the potential energy of hot engine exhaust gases. The thermodynamic efficiency of such gas turbines has not been particularly good, however, nor have these turbines been particularly satisfactory from a mechanical standpoint. The exhaust gases at the point of entry to the turbine normally carry a very high temperature but a relatively low pressure of only one atmosphere or less above atmospheric pressure. Because of their high temperature these gases have relatively small mass per unit volume, with the result that a high gas flow speed must be developed and the turbine has to be operated at a very high circumferential speed in order to deliver any substantial amount of power per unit volume of gas handled. Thus the rotating parts of the turbine have to be designed to stand very high centrifugal stresses as well as very high temperature stresses.

It is therefore another object of the present invention to provide an exhaust gas turbine system of relatively improved thermodynamic efficiency by reducing, if not eliminating, the aforementioned difficulties resulting from high temperature, high speed operation.

In order to accomplish the above object it is a feature of the present invention to employ a displacement and breather pump as an intermediate transformer element between the exhaust gas manifold of an internal combustion engine and a gas turbine. Displacement and breather pumps of a type suitable for use in this connection have been described in my copending U. S. Patents No. 2,234,100, for "Gas pumping" (issued March 4, 1941), and No. 2,226,539 for "Gas pump" (issued December 31, 1940), filed concurrently herewith. A feature of such pumps is the provision of means for efficiently converting the pressure and temperature energy of a unit weight of hot gas into kinetic and pressure energy in other cold gas bodies, of considerably greater weight, thereby making such cold gas bodies available for operating a gas turbine without the difficulties with high temperature and high speed stresses which are normally encountered when using hot gases directly within the turbine. The essential features of such a displacement and breather type pump are a wall enclosed chamber having a recuperator cooling element mounted therein, together with a valved inlet for hot gas opening into its top, and a valved inlet for cold gas and a valved cold gas outlet ported out of its base. In operation the pump chamber is first filled with air or cold gas at substantially atmospheric pressure, after which hot gas is introduced under pressure into the top of the vessel, thereby imparting pressure and kinetic energy to the cold gases which are displaced and forced out of the bottom of the pump by the hot gas. In the second part of the pump cycle the hot gases are expanded to substantially atmospheric pressure, after which they are cooled while trapped within the vessel as by recuperative heat transfer, and the shrinkage in volume which thereby develops creates a partial vacuum which is then used to breathe the cold air or gas into the vessel from some external source under higher pressure.

It will thus be seen that by employing a displacement and breather pump of the type described as an intermediate connecting element between the exhaust manifold of an engine and a gas turbine, the operating cycle of the complete turbine system can actually be continued into the ranges below atmospheric pressure, with considerable increase in thermodynamic efficiency in converting a major part of the pressure and temperature energy of the engine exhaust gases into mechanical work.

The gas exhaust period of any internal combustion engine cycle normally wastes energy in two ways. In the first place a considerable waste of potential pressure energy takes place when the exhaust gas is discharged at high speed to atmosphere without doing useful work. Another energy waste results from the great amount of intrinsic heat energy in the exhaust gases after they have reached pressure balance with the outside atmosphere.

A feature of the present invention is that of providing an exhaust gas turbine system which is adapted to utilize both of these portions of the exhaust energy of an internal combustion engine.

Another object of the invention is to provide method and means for utilizing part of the energy carried by the engine exhaust gases in a novel and improved way for compressing air with which to supercharge the engine.

Further objects and advantages of the present invention will be apparent from the following description, taken in connection with the accompanying drawings, in which:

Fig. 1 is a pressure-volume diagram illustrating the variation in absolute pressure inside a displacement and breather type pump over one complete pump cycle, when operating the pump as part of an exhaust turbine system;

Fig. 2 shows the change in gas weights handled within the pump during one complete operating cycle;

Fig. 3 is a pressure-time diagram of the operating cycle of a displacement and breather type pump;

Fig. 4 is a composite pressure-time diagram of the displacement periods of three displacement and breather pumps operating in sequential phase as part of an exhaust turbine system, the displacement periods overlapping to a moderate extent;

Fig. 5 is a composite pressure-time diagram of the displacement and breathing periods of three displacement and breather pumps operating in sequential phase as part of an exhaust turbine system;

Fig. 6 is a diagrammatic view, showing parts in vertical section and parts in elevation, of a complete power plant including hot and cold gas transfer lines connecting an internal combustion engine, a displacement and breather pump, and a multi-stage gas turbine;

Fig. 7 is an assembly view of a gas turbine system including three displacement and breather pumps operatively connected between an internal combustion engine and a gas turbine, the engine and pumps being shown in perspective while the turbine is shown partly in elevation with an upper segment in longitudinal section to illustrate an exhaust turbine rotor of the reaction type having a group of stages designed for operation under positive pressure and another group of stages designed for operation under negative pressure, and including automatic gas transfer valves actuated under the influence of changing gas pressures;

Fig. 8 is a diagrammatic view showing the operating mechanism and connections for each of the three grid valves respectively controlling transfer of gas from the cold gas discharge ports of the three displacement pumps to the annular nozzles for the two positive pressure stages of the turbine of Fig. 7.

Fig. 9 is a diagrammatic view showing the operating mechanism and connections for each of the three grid valves respectively controlling flow of air from atmosphere through the annular nozzles for the two negative pressure stages of the turbine and thence to the air intake ports of the three displacement pumps of Fig. 7.

It has long been known that gases of different temperature, because of their different densities, tend to arrange themselves in stratified layers when in contact. Such gas stratification is only nullified or disturbed if the whole volume of the hot and cold gas masses is put into a state of more or less violent motion. The operating cycle of the displacement and breather pump element of the present exhaust gas turbine system employs this principle of gas stratification as a means of transferring the pressure and temperature energy of hot engine exhaust gases into kinetic energy of cold gases which are conducted through positive and negative pressure stages of a gas turbine to develop mechanical work. The volumetric capacity of the pump is magnified to a large multiple of the unit volumes of exhaust gas discharges from individual engine cylinders in order that the velocity of influx of exhaust gas from the engine into the pump can be easily reduced, as by means of baffle plates, to prevent violent intermixing of the thus introduced hot gas and the cold gas originally within the pump. The gas stratification which is thus set up within the pump is not disturbed when the hot gases act not only to displace the cold gas out of the pump, but also act simultaneously to compress the cold gas before or while discharging the cold gas. The number of exhaust gas discharges which are to be dealt with inside the pump, or the relative volumetric capacity of the pump, is largely determined by the time required for the efficient cooling of the hot gases during the later cooling and breathing period of the pump cycle.

Referring to Figs. 1 and 6, Fig. 1 shows a pressure volume diagram of the cycle of a displacement and breather pump 30, which pump is coupled into an exhaust turbine system comprising an internal combustion engine 36 and a gas turbine 40 having both positive and negative pressure stages. Pump 30 is provided at its top with a gas inlet 32, controlled by valve 68, which directly and communicably connects with exhaust manifold 34 of engine 36. The volumetric gas storage capacity of the pump 30 is preferably sufficient to hold the exhaust gases discharged from the cylinders of engine 36 during several combustion cycles of the engine, or over a period of several seconds.

In the displacement portion of the pump cycle which is indicated in Fig. 1 by the area 11—12—14—16, the hot exhaust gases from the engine are admitted into the top of the pump 30 through the gas inlet pipe 32, and the cold gases which are present in the pump at the completion of a previous cycle are displaced downwardly by the incoming hot gas and compressed into the lower portion of the pump. On opening a valve 70 in a cold gas discharge line 38 ported out at the bottom of the pump, the thus displaced and compressed cold gas is pushed outwardly through line 38 into and through the positive pressure stages of turbine 40. The cold gas is finally discharged through the port 42 after imparting its kinetic energy to the blades of the turbine. The energy thus imparted to the turbine is substantially the equivalent of the area 11—12—14—16 of Fig. 1.

At the end of this displacement period of the pump cycle, represented by point 16 in the diagram of Fig. 1, the pump 30 is filled up with hot engine exhaust gases which are at substantially atmospheric pressure and at such a high temperature as to represent a very rarified atmosphere. This hot gas is trapped within the pump by closing all valves, and is cooled by indirect heat transfer with a cooling fluid circulated from an outside source by pipes 56—57—58 through spaced radiator sections of a recuperator 48 which is centrally mounted within the pump. The hot gas within the pump is circulated over and through the radiator by means of a fan 50, and the cooling thus effected shrinks the volume of the gas to about one-third of its original volume, thus developing a partial vacuum within the pump. On opening a valve 72 in pipe connection 46 cold atmospheric air is induced to flow into the turbine 40 through an inlet opening 44 and thence through a nozzle into the negative stages of the turbine and through pipe 46 into the bottom of pump 30. The cold air is thus drawn into the pump until a sufficient volume of gas is present in the pump to balance the pressure therein with atmospheric pressure. The work developed by the air thus induced to flow through the negative pressure stages of the turbine during the breathing part of the pump cycle is represented by the area 16—18—20 of the diagram of Fig. 1, this work representing the chief additional gain of work developed by the exhaust turbine system of the present invention as compared to the work developed by other exhaust gas turbine systems. In order to fully illustrate the practical utility of the complete power plant, the internal combustion engine and turbine have both been shown in Fig. 6 as coupled to electric generators 52 and 54, respectively.

The recuperator 48 has been shown as mounted within the inner and smaller of two concentrically and vertically disposed open-ended cylinders 60—62, which cylinders partition the interior of the pump into communicably connecting chambers and passages. The outer cylinder 62 is equipped with an apertured bottom closure plate 64. Immediately below plate 64 there is rotatably mounted an apertured plate shutter 66, the rotation of which is designed to make and break direct communication between the bottom part of pump 30 and the lower portion of the chamber formed within cylinder 62, by bringing the apertures in plate 64 and shutter 66 into and out of register.

During the displacement period the apertures in shutter 66 are held in register with the apertures in the closure 64. The shutters 78 are preferably kept open only until the lower layer of hot gases moves downwardly into contact with the upper radiator of recuperator 48. From here on free passage of gases through the recuperator is blocked by closing shutters 78, and gas then present in the recuperator is trapped therein during the period that the remaining cold gas within the pump is displaced by hot gas. During the breathing period the apertures in shutter 66 are out of register with the apertures in plate 64. The air entering the pump fills up that portion of the pump chamber below the plate 64 and shutter 66 and that portion of the pump surrounding the cylinder 62. At the end of the breathing period the valve 72 is closed, shutter 66 is opened by rotating its apertures into register with the apertures in plate 64, and the body of air is allowed to seek its own level by stratification arrangement beneath the upper layer of lighter cold exhaust gas which is present in the pump at the end of the cooling period. The pump is then ready to begin a new cycle. The particular pump construction illustrated has been designed primarily to insure minimum contamination of the air by the engine exhaust gases, in order that such air may be available for supercharging the engine 36 whenever desired.

Valves 68 and 70 are shown in Fig. 6 as actuated in timed sequence from cam shafts 74 and 76. Shafts 74 and 76 are operatively connected by a vertical shaft 80, and shaft 76 is shown as powered directly from the drive shaft of engine 36. Fan 50 is also connected for operation from cam shaft 76, as is also shutter 66. Shutters 78 may be disposed in position to control circulation of gas through the radiator sections of recuperator 48, and may be actuated by cams 79 journaled on the vertical shaft 80. In order to permit use of the pump 30 for precompression of atmospheric air for supercharging engine 36, an additional air discharge valve 84 is mounted at the base of the pump and operatively connected for actuation and timing from shaft 76. Air compressed in the bottom of pump 30 may be passed by valve 84 (when opened) through an airline 86 to an intake manifold 88 of the engine 36.

The indicator card of Fig. 1 has many of the characteristics of a normal card for a piston engine with outside admission. The upper part of the card from 10—16 demonstrates the compression and displacement period of the turbine cycle, and the lower part of the card from 16—20 demonstrates the cooling and breathing period of the cycle. In Fig. 2 the same numerals are used as in Fig. 1 to designate the same cyclic steps. However, in Fig. 2 the ordinates indicate the gas weights handled inside the pump, expressed in multiples of the weight of exhaust gas introduced to the pump from the engine. The gas weight values which are plotted in Fig. 2 are taken from a definite example in which the cold gases were discharged from the pump at a maximum pressure of two atmospheres absolute, the temperature of the exhaust gases being 1600° F. absolute.

Analyzing the cycle diagrams of Figs. 1 and 2 in detail, it will be seen that the turbine may be operated on a cycle either of best efficiency or of greatest power capacity, depending on whether the cycle is conducted along the expansion curve 14—16, or along the broken line 14—15—16. In either case, during the period 12—14 the same proportion of cold gas is discharged from the pump under full pressure potential $\Delta P$, represented by 11—12. Moreover, the cold gas which is discharged during the balance of the displacement portion of the cycle is the same in weight whether the cycle is operated along the curve 14—16 or along 14—15. According to the cycle of best efficiency, the balance of the cold gas is discharged from the pump under a changing pressure differential dropping from $\Delta P$ to zero. In operating the pump on a cycle of greatest capacity, the cold gas is displaced from the pump under a constant pressure differential $\Delta P$ maintained at its full magnitude to the end of the displacement period at 15. Obviously the cold gas carries a maximum amount of energy when discharged under the second method of maximum capacity. The first method of maximum efficiency discharge 14—16 requires a time period essentially longer than the second method 14—15.

Another difference in the operation of the pump involves the weights of the hot engine exhaust gases which are handled by the pump. In the first method of best efficiency the plan is to stop the admission of exhaust gases at a point 14 from which the hot gas when expanded to the full volume of the pump at point 16 will have been reduced to substantially atmospheric pressure. Thus according to this method the volume of exhaust gases admitted to the pump returns the maximum of expansive working capacity, as illustrated by the area 10—12—14—16. Thus this cycle is one of best efficiency. On the other hand, when operating on the cycle of maximum capacity, the pump is filled with hot gases at point 15, which gases are, however, under the maximum pressure at which they enter the pump from the engine. Thus in this case the pump has a greater weight of hot gas present, as indicated by the ordinate 18—15 in Fig. 2, as compared to the ordinate 18—16 representing the weight of gas present at the end of the displacement period when operating on the cycle of best efficiency.

When operating on the cycle of best efficiency, the exhaust gases at point 16 have reached a balance with atmospheric pressure, and may be subjected immediately to the cooling process in order to make their remaining intrinsic heat do further work. During the cooling process the exhaust gas shrinks in volume and the pressure within the pump is lowered until at point 18, where the gas temperature has dropped to substantially atmospheric temperature, the pressure of the gas has been reduced to about one-third of an atmosphere. By then admitting fresh air to the pump by way of a turbine wheel this partial vacuum is gradually filled up along the curve 18—20, with full atmospheric balance restored at 20. The curve 18—20 may be interpreted as an average isothermal compression curve. At point 18 the temperature of the gas within the pump has been cooled substantially to atmospheric and during breathing period 18—20 this temperature has a tendency to rise adiabatically. However, as the outside air is drawn into the pump through the turbine nozzle it is cooled down adiabatically below its initial outside atmospheric temperature, and this refrigeration effect more than compensates for the adiabatic heating effect which takes place within the pump during the breathing and "compressing" period 18—20.

With the second plan of pump operation heretofore designated as the maximum capacity cycle, the cycle may proceed from point 15 in three different ways. By releasing the excess volume of exhaust gas from the pump directly to the outside atmosphere the total mass of hot gases within the pump will expand to a point 17, with a volume of gas corresponding to 10—16 left inside the pump while the balance of the gas 16—17 has been discharged to the outside atmosphere. According to this plan the expansive work 15—16—17 would be lost.

Another possible plan of operation would be to begin cooling the gas within the pump without discharging the gas. This plan, however, would result in appreciable loss of suction intake work 16—18—20. The lowest pressure obtainable in the pump in this case would be about two-thirds of an atmosphere absolute, as compared to the one-third atmosphere developed according to the preferred plan of operation, with the result that a correspondingly much lower volume of air would be taken into the pump during the breathing portion of the cycle.

A more economical and practical plan of operation is that indicated by the pressure time diagrams of Figs. 4 and 5, in which the exhaust turbine system incorporates several displacement pumps I, II, III connected and timed for operation on successive evenly phased slightly overlapping cycles to handle all of the exhaust gas discharged from a continuously operating internal combustion engine, and to deliver cold gas substantially continuously to the positive and/or negative pressure stages of a gas turbine.

According to this plan of operation, the admission of hot exhaust gas to the first pump I is continued beyond point 15 for a short period to point 26 (Figs. 3 and 4), at which point the hot gas admission valve of pump I closes. Admission of hot exhaust gas to the next pump II in the series starts at a point 24' somewhat before the time that admission of hot gas to pump I ceases. During the period of overlap when the hot gas intake valves of both pumps are open, the pumps are communicably connected, and a very rapid introduction of hot gas to pump II takes place along the line 24'—26, point 26 lying approximately halfway between points 10' and 12' on the compression curve of pump II. This rapid rise of pressure in pump II is due mainly to the quick transfer of gases from pump I, and to the rapid interbalancing of the pressure levels in pumps I and II during the short period 15—26. Beyond point 26 all the hot gas discharged from the engine is admitted to pump II alone. Discharge of gas from pump I continues beyond 26 down to the atmospheric pressure point 16.

Discharge of gas from pump II begins at 12'. There is a short time interval separating the end point 16 of the gas discharge from pump I from the initial point 12' of gas discharge from pump II. During this short time interval the displacement gas pressure curve in front of the nozzle of the positive pressure stages of the turbine drops to substantially zero, as shown in Fig. 5. One advantageous result of operating three pumps in slightly overlapping sequential phase as illustrated by Figs. 4 and 5 is in the very substantial shortening of the period required for effecting precompression, such period being shortened from 10'—12' to 24'—12'. The initial precompression 24'—26 is performed by simultaneously introducing to the second pump II hot gas from the engine exhaust and hot gas transferred from the intake end of pump I. The hot gas transfer operation from one pump to another can readily be handled within the time interval saved by using the more rapid full pressure discharge 14—15 rather than the expansive discharge 14—16 (Fig. 1).

Fig. 5 includes a showing not only of the variations in positive pressure obtaining at the intake nozzle of the positive pressure stages of the gas turbine, but also a showing of the variations in negative pressure developed at the intake nozzle of the negative pressure stages of the turbine during the breathing cycles of the three displacement and breather pumps I, II and III. The composite diagram of Fig. 5 shows that while admission of hot exhaust gases is switched from pump I to pump II, pump III is simultaneously operating on the breathing part of its cycle. The length of the cooling period for each of the three pumps is conveniently chosen such as to place the point of development of maximum suction in one pump at approximately the time that the displacement period in the cycles of two other pumps is passing through its cyclic minimum 15—16—12. With this timing of the peak positive and negative phases of the pump operation there is insured substantial uniformity of rotational speed of the turbine.

The operation of a pump cycle, so far as the gas weights are concerned, may be followed through with reference to Fig. 2. The ordinate at 10 in this example indicates that cold gases are present inside the pump to the extent of three times the unit of weight of hot gas which is to be admitted to the pump as the exhaust of the engine for operating one pump cycle. At point 12 the same three units of cold gas are still present inside the pump, and part of another unit weight of hot gas has been added. From 12 to 16 the cold gas is discharged from the pump at a substantially linear rate. However, during the period 12—14 more hot exhaust gas is introduced to the pump, until at 14 the weight of hot gas reaches the magnitude of a full unit weight 13—14. From this point on the exhaust gas weight within the pump remains constant when operating the pump along the best efficiency cycle, while the weight of cold gas decreases to zero, with the result that at the end of the displacement period 16 only the one unit weight of hot exhaust gas remains inside the pump, such weight being represented by the ordinate 16—18. However, if the pump is operated on the cycle 14—15—16 of maximum capacity, the unit weight of hot exhaust gas within the pump at 14 is further augmented to the total weight of hot gas 15—18 at the end of the cold gas discharge period. At this point the hot gas inlet valve to the pump is closed, and the weight of hot gas within the pump is reduced to the ordinate 16—18 by discharging the gas volume of hot gas 15—16 partly into the next pump in the series and the balance into the turbine.

During the cooling and shrinking period of the cycle, from 16—18 in Fig. 1, the weight of gases inside the pump is not changed, and this weight of gas remains inside the pump during the entire breathing process. However, during this breathing period 18—20 outside air is sucked back into the pump until at point 20 the pump is again filled up with three units of gas weight, made up of one unit weight of cooled exhaust gas 20—22, and two units of fresh intake air 20—21. At this point the pump is ready to initiate a new cycle of operation beginning at point 10.

Thus the working principle of the exhaust turbine system of the present invention can be summarized in simple terms as follows: The external energy present in one unit weight of hot engine exhaust gas is transferred to three unit weights of cold gas, which is displaced by the hot gas and caused to flow thru the positive pressure nozzles and buckets of an exhaust gas turbine. The temperature energy of the unit weight of hot exhaust gas is then utilized to develop partial vacuum sufficient to induce flow of two unit weights of cold gas through the negative pressure stages of the turbine back into the pump. Thus the displacement and breather pump functions as a thermodynamic transformer utilizing a unit weight of hot engine exhaust gases for moving a multiple weight of cold gas through the same pressure differential.

The pressure-volume diagram of the maximum capacity cycle 10, 12, 15, 16, 18, 20 of Fig. 1, when plotted over time, produces a pressure-time card such as illustrated in Fig. 3. In the diagram of Fig. 3 the cold gas discharge period of the pump extends from 12 to 16, and the cold gas intake or breathing period of the pump extends from 18—20. The period from 10—12 or from 24—12 represents the compression period of the pump operation, and during the period 16—18 the gas cooling operation is performed. The length of the pump discharge period 12—16 is definitely related to the pump capacity and to the average pressure head within the pump over this period. The average pressure head within the pump during the discharge period of course depends upon the pressure and volume of hot gas supply from the engine, and upon the size of the nozzle at the entrance of the pressure stages of the turbine.

The length of the cooling period 16—18 is largely controlled by the speed of flow of gas and cooling fluid through the pump recuperator 48. The length of the gas intake or breathing period 18—20 is largely controlled by the dimensioning of the subatmospheric or negative stages of the turbine and by the degree of vacuum developed in the pump.

The modification of turbine 40 which is illustrated in Fig. 7 is designed on the reaction principle, with multiple step expansion. According to the present invention the gases which actuate the turbine have a relatively low (substantially atmospheric) temperature. By subdividing the total available pressure head of the gas into several stages, the velocities of flow $(c)$ for each individual stage can be kept within reasonable limits. Therefore when operating an exhaust turbine of this type even with relatively small circumferential speed $(u)$, because of the lower speed of the rotor the controlling ratio $c/u$ assumes highly favorable proportions and results in a very satisfactory thermodynamic efficiency. Therefore rotor 90 of the turbine illustrated in Fig. 7 is equipped with several rows of blades or buckets 92 operating on gas supplied thereto from displacement and breather pumps I, II and III under positive or superatmospheric pressure and several rows of blades or buckets 94 operating on air flowing through the turbine toward and into the pumps when under negative subatmospheric pressure.

The turbines illustrated in Figs. 6 and 7 are intended for operation on a cycle in which air under atmospheric pressure is supplied to an inlet 44 to the negative pressure side of the turbine during the breathing part of the cycle of a pump 30. It will be appreciated, however, that a modified turbine design may be employed in which part of the cold exhaust gases displaced from the pump 30 through the positive pressure stages of the turbine may be redrawn into the pump during the breathing period of the pump cycle.

In the exhaust turbine system which is illustrated in Fig. 7, the exhaust gas inlet valves 68, which regulate admission of exhaust gas from pipe 32 successively into each of three pumps 30 designated I, II and III, are actuated in timed sequence from the cam shaft 74 through cams and rocker arms 122. Pumps I, II and III may be operated on slightly overlapping phases, as illustrated in Fig. 4, by so timing the operation of the gas admission valves 68, for example, that valve 68 controlling admission of gas from pipe 32 to pump II may open before the valve 68 controlling admission of gas to pump I has closed. Thus for the brief interval during which gas may flow between the engine and each of the pumps I and II, the pressure in pump I will tend to drop to equalize the pressure in pump II at substantially the point 26 of Fig. 4, and at this instant the valve 68 controlling admission of gas to pump I should be closed. Cold gas is discharged from pumps I, II and III through pipes 124, 126 and 128 respectively whereby the gas is conducted to the inlet nozzle of the positive pressure stages of turbine 40. Similarly air flowing through the negative pressure stages of the turbine is conducted to the respective pumps I, II and III through pipes 130, 132, 134. It will be appreciated that with this arrangement of cold gas transfer lines connecting the pumps I, II and III with the negative pressure stages of the turbine, the valve 70 controlling transfer of cold gas from pump I to the positive stages of the turbine must be closed some short time after the instant that the corresponding valve 70 opens to communicably connect pump II with the inlet nozzle to the positive pressure stages of the turbine 40. Likewise the valve 72 controlling admission of air from the negative pressure side of the turbine to pump III must close shortly after the instant that the corresponding valve 72 opens communication between the negative pressure stages of the turbine and pump I. Opening and closing of each of the gas discharge valves and air inlet valves operatively associated with the pumps I, II and III is effected in timed sequence through the cam shafts 76 and cams operatively connecting these shafts with the stems of each of the valves 70 and 72.

The turbine system illustrated in Fig. 7 may be modified by replacing the individual gas transfer lines for conducting gas between each pump and the positive and negative pressure stages of the turbine, by a common single main gas transfer manifold leading from all the pumps to the turbine, and a single cold gas transfer manifold leading from the turbine to the pumps. Such simple and preferred arrangement is possible when the discharge cycles and the breathing intake cycles of the individual pumps are timed so as not to overlap or, in other words, when pump II begins to discharge at 12' only after pump I has ceased to discharge at 16 and so on. If there were an overlap of two pump discharges (or of two intakes) a blow-back period between two sequentially phased pumps would be inevitable.

If however a turbine intake pressure curve of less fluctuation than shown in Fig. 5 is wanted, then the individual discharge and intake periods of the pumps have to be extended and have to be overlapped on both ends. In this case pumps and turbines become operative when individual gas transfer lines are provided from the pumps to the turbine and back to the pumps with an automatic control valve arranged between each transfer line and the turbine, as illustrated by Figs. 7, 8 and 9.

Pipe 124 is illustrated as directly connecting the cold gas discharge end of its corresponding pump I with the positive pressure stages of the turbine, such connection being controlled by the automatic grid valve 118. Likewise a pipe 132 has been shown leading off from the discharge end of the negative pressure side of the turbine directly to the air inlet port to another pump II. A valve 120 is interposed between the air transfer line 132 and the negative pressure stages of the turbine. Valves 118 and 120 resemble in their construction and operation the gridiron valves which are used in steam turbine practice. The function of these valves is to transfer the working gases automatically to the proper stages of the turbine when the admission pressure in the individual supply lines undergoes certain changes. Valve 118 has been shown as apertured at 136 and as actuated through a pneumatic pressure cylinder 138 and piston mounted on a stem 154 of the valve. In the position shown, the piston in cylinder 138 is at the extreme left of its throw, where aperture 136 of valve 118 connects pipe 124 with the transfer passage 140 leading to the three positive pressure stages 142, 144 and 146. The piston is held in this position during the first part of the discharge period of pump I (12—15 of Fig. 1) by pneumatic pressure supplied from the pipe 124 to the cylinder 138 through a connection 148. Another pipe connection 150 subjects the left hand side of the piston in cylinder 138 to any pressure in the discharge pipe 126 leading off from the pump II discharging in sequential phase. A lost motion mechanism 152, the principal element of which is a compression spring, is mounted on the end of stem 154 of valve 118. The spring in mechanism 152 opposes movement of the piston in cylinder 138 away from the midpoint of the cylinder at which point the aperture 136 in the valve is out of register with any of the gas transfer passages. As the pressure drops in the pump I supplying gas to the turbine through pipe 124, mechanism 152 functions to throw valve 118 to the right, and when pressure is applied through pipe 150 the valve moves to the point where the aperture 136 registers with a transfer passage 156 leading to the inlet of the last positive pressure stage 146 of the turbine. Thus much of the remaining cold gas may be discharged from the pump under the lower pressure existing in pump I along the line 26—16 of Fig. 4 through the last positive pressure stage of the turbine, and this low pressure discharge may continue during the first part of the period when pump II is connected through a pipe 126 and a similar automatic valve to the main inlet nozzle 140 of the turbine. During the last portion of the discharge period 26—16 of pump I the full pressure in the discharge pipe 126 of pump II is impressed through connection 150 on the piston in cylinder 138 to force valve 118 to the extreme right of its throw, at which point aperture 136 registers with an atmospheric discharge passage 158 through which any remaining exhaust gases in pump I may expand to atmospheric pressure by discharge directly to atmosphere. When the pressure in pump II and pipe 150 drops, the valve is pulled to the left by the action of mechanism 152 to the midpoint of its throw preliminary to the start of a new discharge cycle for pump I.

Similarly automatic actuating mechanism for the grid valve 120, on the negative pressure side of the turbine of Fig. 8 is provided, whereby during the first part of the breathing period of pump II atmospheric air may flow through all three stages 160, 162 and 164 of the turbine, and thence to the corresponding pump (II) through direct connecting pipe (132). After the partial vacuum in the pump has been somewhat reduced, the valve actuating mechanism functions to shift the aperture in valve 120 out of register with the discharge side of stage 164 and into register with the discharge side of stage 162, so that during the latter period of the breathing cycle air flows only through two negative pressure stages 160 and 162 before entering the pump. As soon as the full suction of the sequentially phased pump III makes itself felt in its suction line 165, valve 120 is thrown to its extreme left hand position, where its aperture registers with a passage 166 which directly connects pipe 132 with atmospheric intake 44, by-passing all of the negative pressure stages of the turbine. Naturally the automatic valve mechanism shown in Fig. 8 may be substituted by a positive cam or eccentric drive valve control mechanism.

Having thus described the invention in its preferred form, what is claimed as new is:

1. The method of utilizing some of the heat energy in a body of hot gases which comprises, introducing gas from the body into a chamber and trapping the gas therein after its pressure has been reduced substantially to atmospheric, circulating a cooling fluid through the chamber in indirect heat transfer relation with the hot gases to reduce the temperature of the gas and thereby develop a partial vacuum within the chamber, and utilizing the vacuum thereby developed to induce flow of a stream of cold gas from a source under higher pressure through a gas turbine.

2. The method of converting to mechanical energy part of the energy content of a body of hot gases under superatmospheric pressure which comprises transferring said energy from the hot gas to a corresponding volume of cold gas of greater weight by introducing the hot gas into one end of a vessel filled with cold gas under substantially atmospheric pressure, compressing the cold gas and discharging it as a flowing stream from the other end of the vessel by pressure balancing stratification displacement action while filling the vessel with the hot gas and trapping it against escape, conducting the stream of compressed cold gas thus discharged from the vessel directly through a gas turbine, expanding the hot gas within the vessel down to atmospheric pressure by release to atmosphere, developing a partial vacuum within the vessel, and utilizing such partial vacuum to scavenge the vessel with a new supply of cold gas before repeating the cycle.

3. The method of converting to mechanical energy the energy content of a body of hot gas under superatmospheric pressure which comprises, transferring said energy from the hot gas to a corresponding volume of cold gas of greater weight by introducing the hot gas into the upper part of a vessel filled with cold gas under substantially atmospheric pressure, compressing the cold gas into the lower part of the vessel by density stratification displacement action of the hot gas while cooling the cold gas and trapping it against escape from the vessel, and discharging the compressed cold gas from the lower part of the vessel directly through a gas turbine while expanding the volume of the hot gas to fill the vessel.

4. The method of generating power which comprises exploding combustible charges of air and fuel within the cylinders of an internal combustion engine, converting part of the energy thereby liberated into mechanical energy by means of pistons reciprocating within said cylinders, discharging a controlled volume of hot gaseous products of combustion under pressure from the engine into one end of a vessel filled with cold gas under substantially atmospheric pressure, compressing the cold gas into the opposite end of the vessel by stratification displacement action of the hot gas and discharging the compressed cold gas from the vessel in a flowing stream ahead of the advancing hot gas while trapping the hot gas against escape, conducting the stream of compressed cold gas thus discharged directly into a power developing zone to recover energy therefrom, and before repeating the cycle releasing hot gas from the vessel to atmosphere and scavenging the vessel with a fresh supply of cold gas.

5. The method of generating power which comprises, exploding combustible charges of air and fuel within the cylinders of an internal combustion engine, converting part of the energy thereby liberated into mechanical energy by means of pistons reciprocating within said cylinders, discharging a controlled volume of hot gaseous products of combustion under pressure from the engine into one end of a vessel filled with cold air, compressing the air into the opposite end of the vessel by pressure balancing stratification displacement action of the hot gas and discharging the compressed air from the vessel while filling the vessel with the hot gas and trapping the hot gas against escape, conducting the compressed air thus discharged directly to the engine for admixture with fuel preliminary to a subsequent explosion step, expanding the hot gas within the vessel down to atmospheric pressure by release therefrom, and filling the vessel with a fresh supply of cold air before repeating the cycle.

6. The method of generating power which comprises exploding a combustible mixture of air and fuel within an internal combustion engine cylinder, converting part of the energy thereby developed to mechanical energy by means of a piston reciprocating in said cylinder, discharging the hot gas products of the explosion from the cylinder into a chamber and trapping the hot gas therein after its pressure has reached substantially atmospheric, circulating a cooling fluid through the chamber in indirect heat transfer relation with the hot gas and reducing the temperature of the gas, thereby developing a partial vacuum within the chamber, utilizing the vacuum thereby developed to induce inflow of cold gas into the chamber from an outside source under higher pressure, and converting part of the kinetic and pressure energy of the cold gas flowing into the vessel to mechanical energy by directing the gas flow through a gas turbine.

7. The method of converting to mechanical energy the energy content of a body of hot gases under superatmospheric pressure which comprises transferring said energy from the hot gas to a corresponding volume of cold gas of greater weight by introducing the hot gas into one end of a vessel filled with cold gas under substantially atmospheric pressure, forcing the cold gas into the other end of the vessel and compressing it by stratification displacement action of the hot gas, discharging the cold gas from the vessel while filling the vessel with hot gas, and converting part of its energy into mechanical energy by directing the cold gas through a gas turbine.

8. The method as defined in claim 7 together with the step of expanding the hot gas within the vessel down to substantially atmospheric pressure, trapping the gas within the vessel while reducing the gas temperature, thereby developing a partial vacuum, and utilizing said partial vacuum to induce flow of cold gas under higher pressure through a gas turbine.

9. The method of utilizing energy carried by a body of hot waste combustion gases discharged under pressure from the cylinders of an internal combustion engine over a period of several combustion cycles which comprises trapping within a vessel at substantially atmospheric pressure a body of cold air corresponding in volume to the body of hot waste gases available, introducing said waste gases into one end of the vessel in direct contact with the cold air and thereby displacing the cold air while maintaining stratification of the hot gas and cold air, conducting the cold air at an increased pressure imparted by the hot gas from the other end of the vessel to the air inlets of the engine cylinders, expanding the waste gases within the vessel down to atmospheric pressure by release to atmosphere, developing a partial vacuum within the vessel, and utilizing such partial vacuum to scavenge the vessel with a new supply of cold air before repeating the cycle.

10. The method of generating power which comprises exploding a combustible mixture of air and fuel within an internal combustion engine cylinder, converting part of the energy thereby liberated into mechanical energy by means of a piston reciprocating within the cylinder, trapping a body of cold air in a vessel at substantially atmospheric pressure, introducing hot gaseous explosion products from the cylinder under pressure into one end of the vessel in direct contact with the cold air, thereby displacing the cold air and compressing it by a pressure balancing operation, discharging compressed cold air from the other end of the vessel at a substantially constant pressure while continuing the introduction of hot gas thereto conducting the compressed air directly to the engine for admixture with fuel preliminary to another explosion, discontinuing the introduction of hot gas to the vessel and expanding the hot gas within the vessel down to atmospheric pressure by release therefrom, and scavenging the vessel with a new supply of cold air.

11. The method of utilizing the energy in hot waste combustion gases discharged from the cylinders of an internal combustion engine which comprises, trapping within a plurality of vessels at substantially atmospheric pressure bodies of cold gas each corresponding in volume to the hot waste gases available over several combustion cycles, introducing the waste gases under low pressure into the upper part of one of said vessels above and in direct contact with the cold gas, thereby displacing the cold gas downwardly in the vessel while maintaining density stratification of the hot and cold gases, conducting the cold gas at an increased pressure imparted by the hot gas from the lower part of the vessel through positive pressure stages of a turbine while continuing introduction of the hot gases to the vessel, and when the first-named vessel has been substantially emptied of cold gas introducing the hot gases from the engine into the upper part of a second vessel and discharging compressed and displaced cold gas therefrom through the turbine while discontinuing the introduction of hot gases to the first vessel and scavenging that vessel with cold gas preparatory to the start of a new cycle.

12. The method as defined in claim 11 together with the steps of expanding the hot gas in each of the vessels down to atmospheric pressure after the cold gas has been discharged therefrom, cooling the hot gas while trapping it within the vessel down to substantially atmospheric temperature, thereby developing a partial vacuum, and utilizing the vacuum thereby developed to induce flow of cold gas through negative pressure stages of a turbine into the vessel.

13. In power generating apparatus, an internal combustion engine including a combustion cylinder and a piston mounted for reciprocation therein, an intake manifold for introducing fuel and air into the cylinder, an exhaust manifold for receiving gaseous products of combustion from the cylinder, a displacement pump comprising an enclosed chamber having a hot gas inlet opening into one end thereof, a pipe communicably connecting said inlet with the engine exhaust manifold, a valve mounted in said inlet, a cold air inlet and an air outlet ported out in the other end of said chamber, valves mounted in the respective cold air inlet and air outlet, a pipe communicably connecting said air outlet with the engine intake manifold and a recuperator having heat transfer walls within the chamber and having connections for circulating a cooling fluid therethrough.

14. In power generating apparatus, an internal combustion engine including a combustion cylinder and a piston reciprocably mounted therein, a device for introducing fuel and air into the cylinder, an exhaust manifold for receiving gaseous products of combustion from the cylinder, a displacement pump comprising an enclosed chamber having a hot gas inlet opening into one end thereof, a pipe communicably connecting said inlet with the exhaust manifold, a valve mounted in said inlet, a cold gas inlet and a cold gas outlet ported out of the opposite end of said chamber, valves mounted in the respective cold gas inlet and gas outlet, a recuperator having heat transfer walls within the chamber together with connections for circulating a cooling fluid therethrough and a gas turbine communicably connected with the gas outlet to receive cold gas discharged from the pump.

15. In power generating apparatus, an internal combustion engine including a combustion cylinder and a piston reciprocably mounted therein, a device for introducing fuel and air into the cylinder, an exhaust manifold for receiving gaseous products of combustion from the cylinder, a breather pump comprising an enclosed chamber having a hot gas inlet opening into its top, a pipe communicably connecting said inlet with the engine exhaust manifold, a valve mounted in said inlet, a cold gas inlet and a gas outlet ported out of the base of said chamber, valves mounted in the respective cold gas inlet and gas outlet, a recuperator mounted within the chamber, and a gas turbine communicably connected with the cold gas inlet of the pump through which cold gas must flow on its way to the pump.

16. In power generating apparatus, an internal combustion engine including combustion cylinders and pistons reciprocably mounted therein, an intake manifold for introducing air into the cylinders, an exhaust manifold for receiving gaseous products of combustion from the cylinders, a displacement compressor comprising an enclosed chamber having a hot gas inlet opening into one end thereof, a gas transfer pipe communicably connecting said inlet with the engine exhaust manifold, a cold air inlet and an air outlet ported out in the other end of said chamber, an air transfer pipe connecting said air outlet with the engine intake manifold within, and valve mechanism operatively connected with the engine for controlling transfer of gas between the engine and the compressor and transfer of air from the compressor to the engine.

17. Apparatus as defined in claim 14 together with a second displacement pump of like design with valved pipe connections respectively communicably connecting its hot gas inlet with the engine exhaust manifold and with the hot gas inlet of the first pump, and a connection between the cold gas outlet of the second pump and the gas intake of the turbine.

18. Apparatus as defined in claim 15 together with a second breather pump of like design having its hot gas inlet communicably connected to the engine exhaust manifold and having its cold gas inlet communicably connected with the gas turbine so that the cold gas flowing toward the pump may pass through the turbine.

19. In a gas turbine system, a displacement pump comprising an enclosed chamber having a valve controlled hot gas inlet at one end thereof, a pipe communicably connecting said inlet with a source of gas under superatmospheric pressure and high temperature, a valved scavenging gas inlet and a valved cold gas outlet both ported out of the opposite end of said chamber, means connecting said scavenging gas inlet with a source of cold gas under substantially atmospheric temperature and pressure, a recuperator with heat transfer walls mounted within the cold gas outlet end of said chamber and having connections for circulating a cooling fluid therethrough, a gas turbine, and a pipe connecting the gas inlet of the turbine to the cold gas outlet of the pump.

20. Apparatus as defined in claim 19 in which the turbine is equipped with impeller blades arranged in a number of stages, and in which a valve mechanism is disposed in the pipe connection between the turbine and pump for regulating the number of turbine stages through which gas discharged from the pump is passed.

21. In a gas turbine system, a breather pump comprising an enclosed chamber having a valved hot gas inlet opening into one end thereof, a pipe communicably connecting said inlet with a source of high temperature gas, a valved cold gas inlet and a valved gold gas outlet ported out at the opposite end of said chamber, a recuperator mounted within the chamber having connections for circulating a cooling fluid therethrough, a gas turbine having a discharge port and an intake port, and a connection communicably connecting the turbine discharge port with the cold gas inlet of the pump, the turbine intake port being connected to a source of cold gas.

22. Apparatus as defined in claim 21, in which the turbine is equipped with a plurality of impeller elements arranged in a plurality of stages, and in which valve mechanism is disposed in the connection between the discharge end of the turbine and the cold gas inlet of the pump for regulating the number of turbine stages through which cold gas is passed on its way to the pump.

23. In power generating apparatus, an internal combustion engine including a combustion cylinder and a piston mounted for reciprocation therein, an intake manifold for introducing fuel and air into the cylinder, an exhaust manifold for receiving gaseous products of combustion from the cylinder, a displacement pump comprising an enclosed chamber having a valved gas inlet opening into one end thereof, a pipe communicably connecting said inlet with the exhaust manifold, a valved air inlet and a valved air outlet ported out of the opposite end of said chamber, means arranged to periodically develop a partial vacuum within said chamber, and a pipe communicably connecting the air outlet with the engine intake manifold.

24. Apparatus as defined in claim 23 together with a gas turbine, and a pipe connection communicably connecting the inlet end thereof with the pump air outlet to receive cold air discharged from the pump.

25. In a gas turbine system, a positive pressure gas turbine having an inlet nozzle and a discharge port, a plurality of displacement pumps each comprising an enclosed chamber having a valved hot gas inlet at one end thereof and having a valved cold gas inlet and a valved cold gas outlet ported out of the opposite end thereof, a pipe communicably connecting the hot gas inlets of the pumps with a source of hot gas under superatmospheric pressure, means connecting the cold gas inlets of the pumps with a source of cold gas under substantially atmospheric pressure, pipes communicably connecting the turbine inlet nozzle with the cold gas outlets of the pumps, and valve actuating and timing mechanism for operating the pumps in sequential phase to supply cold gas substantially continuously to the turbine.

26. In a gas turbine system, a gas turbine having an inlet nozzle and a discharge port, a plurality of breathing pumps each comprising an enclosed chamber having a valved hot gas inlet at one end and a valved cold gas outlet and a valved cold gas inlet at the other end, a pipe communicably connecting the hot gas inlets of all the pumps with a source of high temperature gas, a recuperator mounted within the chamber of each pump and having connections for circulating a cooling fluid therethrough, pipes communicably connecting the cold gas inlets of each of the pumps with the turbine discharge port, and valve actuating and timing mechanism for operating said pumps in sequential phase for inducing flow of cold gas substantially continuously through the turbine.

27. The method of utilizing the energy content of a body of hot gaseous products of combustion under pressure within an exhaust manifold of an internal combustion engine which comprises, trapping a body of air in an enclosed chamber at substantially atmospheric pressure, transferring said body of hot gaseous products of combustion from the engine exhaust manifold into one end of said chamber thereby compressing the air at the other end of the chamber by pressure balancing displacement while trapping the hot gas against escape from the chamber, transferring the compressed air from the chamber directly to an intake manifold of the engine as supercharge air while filling the chamber with the hot gas, expanding the hot gas within the chamber down to atmospheric pressure by release to atmosphere, developing a partial vacuum within the chamber, and utilizing such partial vacuum to scavenge the chamber with a new supply of air before repeating the cycle.

JOHANN J. WYDLER.

CERTIFICATE OF CORRECTION.

Patent No. 2,277,471.                                           March 24, 1942.

JOHANN J. WYDLER.

It is hereby certified that error appears in the printed specification of the above numbered patent requiring correction as follows: Page 8, second column, line 52, claim 16, strike out "within"; page 9, first column, line 25, for "gold" read --cold--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents